United States Patent [19]

Takahashi et al.

[11] 4,195,585
[45] Apr. 1, 1980

[54] PROTECTION APPARATUS FOR ELECTRIC SEWING MECHINE

[75] Inventors: Tadashi Takahashi; Shigeki Morinaga, both of Hitachi, Japan

[73] Assignee: Hitachi, Ltd., Japan

[21] Appl. No.: 891,034

[22] Filed: Mar. 28, 1978

[30] Foreign Application Priority Data

Mar. 30, 1977 [JP] Japan .............................. 52-37950[U]
Jun. 24, 1977 [JP] Japan .................................. 52-74387

[51] Int. Cl.² .............................................. D05B 69/36
[52] U.S. Cl. .................................................. 112/277
[58] Field of Search ....................... 112/277, 275, 273; 318/467

[56] References Cited

U.S. PATENT DOCUMENTS

| 3,761,790 | 9/1973 | Daab | 318/467 |
| 3,843,883 | 10/1974 | De Vita et al. | 112/273 X |
| 4,080,914 | 3/1978 | Ishida et al. | 112/277 |

FOREIGN PATENT DOCUMENTS 2726187 12/1977 Fed. Rep. of Germany ........... 112/275

*Primary Examiner*—Peter P. Nerbun
*Attorney, Agent, or Firm*—Craig and Antonelli

[57] ABSTRACT

A protection apparatus for an electric sewing machine having a drive mechanism for driving the sewing machine by a motor comprises a speed detecting means for detecting a rotational speed of a shaft of the sewing machine, comparator means for comparing a rotational speed signal of the shaft of the sewing machine from the speed detecting means with an externally applied speed command signal indicative of a predetermined rotational speed of the sewing machine to determine from the comparison result whether the sewing machine is in a fault state, and invalidation means for deactivating the drive mechanism when the fault state of the sewing machine is determined by the comparison means. The protection apparatus detects the rotation of the shaft of the sewing machine while an operation command for the sewing machine is being inputted to early-detect an overload condition of the sewing machine. When an overload condition is detected, the motor and hence the sewing machine is stopped to prevent the damage of the motor.

7 Claims, 12 Drawing Figures

PROTECTION APPARATUS FOR ELECTRIC SEWING MECHINE

BACKGROUND OF THE INVENTION

1. Field of the Invention

The present invention relates to a protection apparatus for an electric sewing machine, and more particularly to a protection apparatus for an electric sewing machine which early-detects an abnormality or fault of the sewing machine while an operation command for the sewing machine is being inputted to stop the drive of the sewing machine.

2. Description of the Prior Art

A prior art electric sewing machine includes a clutch motor unit and a sewing machine body driven thereby. The clutch motor unit has a clutch friction plate mounted at an axial end of a motor, a clutch plate mounted axially movably on an output driven shaft and arranged to oppose to the clutch friction plate and a brake plate. As disclosed in the U.S. Pat. No. 3,761,790, for example, the clutch motor section further includes a clutch coil i.e., clutch winding CL arranged in proximity to the clutch plate, a brake coil i.e., brake winding BR arranged in proximity to the brake plate, a trimming solenoid for actuating a trimmer and a wiping solenoid for wiping a trimmed thread. These coils and solenoids are energized or deenergized by a control unit through transistors or the like.

Mounted on the rotational shaft of the sewing machine body are a position detector for detecting the vertical position of the needle of the sewing machine and the speed detector for detecting the rotational speed, output signals of the position detector and the speed detector being applied to the control unit as control inputs thereto.

When a drive command for driving the shaft of the sewing machine at a predetermined rotational speed is inputted by an instruction unit coupled to a pedal of the sewing machine, the clutch coil CL is energized through the control unit so that the clutch plate is brought into contact with the clutch friction plate to transmit the rotation of the motor to the driven shaft of the sewing machine through the clutch plate, a pulley and a belt. The rotational speed of the shaft of the sewing machine is detected by the speed detector, an output of which is fed back to the control unit to drive the shaft at the predetermined rotational speed.

When the sewing machine is to be stopped, the brake coil BR is energized so that the brake plate is brought into contact with the brake friction plate to stop the rotation of the pulley attached to the shaft of the sewing machine.

In such a prior art sewing machine, however, when the sewing machine is locked due to a fault, the sewing machine is overloaded or the rotational speed of the sewing machine does not reach the commanded rotational speed because of motor trouble or a reduction of power supply, the motor may be damaged by overload or the clutch coil CL may be damaged by the long-term energization thereof. Furthermore, if the belt is loosen to inspect the sewing machine under such a condition, the motor may undesirably rotate the belt through the output shaft because the motor is suddenly put into a non-loaded condition.

SUMMARY OF THE INVENTION

It is an object of the present invention to provide an electric sewing mchine which overcomes the problems encountered in the prior art machine and which detects the rotational speed of the shaft of the sewing machine while the operation command for the sewing machine is being issued to quickly detect the overload condition so as to stop the motor and hence the sewing machine in order to prevent damage to the motor.

It is another object of the present invention to provide a sequence control apparatus which uses a microcomputer in a control circuit to detect any fault in the sewing machine, such as locking of the machine during the operation thereof and to shift the operation of the sewing machine to a predetermined sequence when an abnormal state or fault state is detected.

The electric sewing machine in accordance with the present invention comprises a drive mechanism for driving the sewing machine by a motor, a speed detecting means for detecting a rotational speed of a moving shaft of the sewing machine, comparator means for comparing a rotational speed signal of the sewing machine from said speed detecting means with an externally applied speed command signal indicative of a predetermined rotational speed of the sewing machine to determine from the comparison result whether the sewing machine is in a fault state, and invalidation means for deactivating the drive mechanism when the fault state of the sewing machine is determined by the comparator means.

The above and other objects, features and advantages of the present invention will become apparent from the following detailed description of the invention when taken in conjunction with the accompanying drawings.

THE DESCRIPTION OF THE PREFERRED EMBODIMENTS

Figure 1:
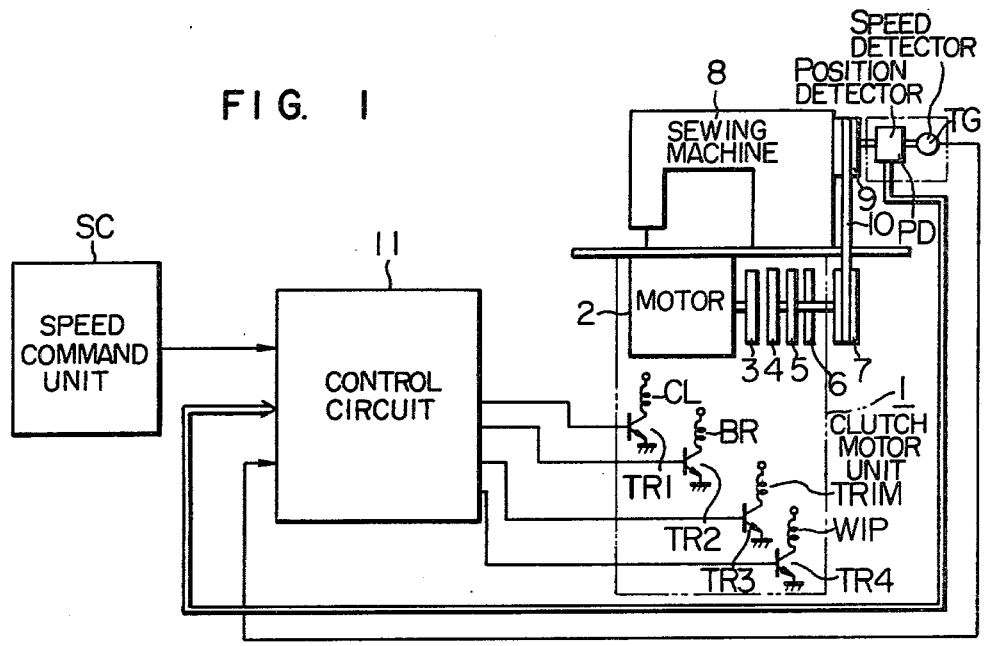
FIG. 1 is a block diagram showing a drive unit for the sewing machine in accordance with one embodiment of the present invention.

FIG. 1 shows a block diagram of one embodiment of the present invention, in which numeral 1 denotes a clutch motor unit which functions as a drive source for the sewing machine, and it comprises a clutch friction plate 3 mounted at an axial end of a motor 2, a clutch plate 4 axially movably mounted on a driven shaft and arranged to couple and oppose to the clutch plate 3, a brake plate 5 and a stationary brake friction plate 6 arranged to selectively engage the brake plate 5.

Mounted at one end of the output shaft on which the clutch plate 4 and the brake 5 are mounted is a pulley 7 which is coupled through a belt 10 to a pulley 9 mounted on the driven shaft of a sewing machine 8.

In the clutch motor unit 1, a clutch winding CL which is adapted to be energized through a transistor $TR_1$ and a brake winding BR which is adapted to be energized through a transistor $TR_2$ are arranged in proximity to the clutch plate 4 and the brake plate 5, respectively.

The energization of the clutch winding CL and the energization of the brake winding BR are controlled by a control circuit 11, which controls, in addition to the clutch winding CL and the brake winding BR, a trimming solenoid TRIM for actuating a trimmer and a wiping solenoid WIP for wiping the trimmed thread, these solenoids being connected to supply voltage through transistors $TR_3$ and $TR_4$, respectively.

Mounted on the shaft of the sewing machine 8 are a position detector PD for detecting the vertical position of the needle of the sewing machine and a speed detector (e.g., tachogenerator) TG for detecting the rotational speed of the shaft of the sewing machine 8, outputs of the position detector PD and the speed detector TG being fed back to the control circuit 11 as control inputs thereto.

SC denotes a speed command unit coupled to a pedal of the sewing machine and adapted to be operated by an operator to drive the shaft of the sewing machine 8 at a predetermined rotational speed. An output of the speed command unit SC is applied to the control circuit 11.

Figure 2:
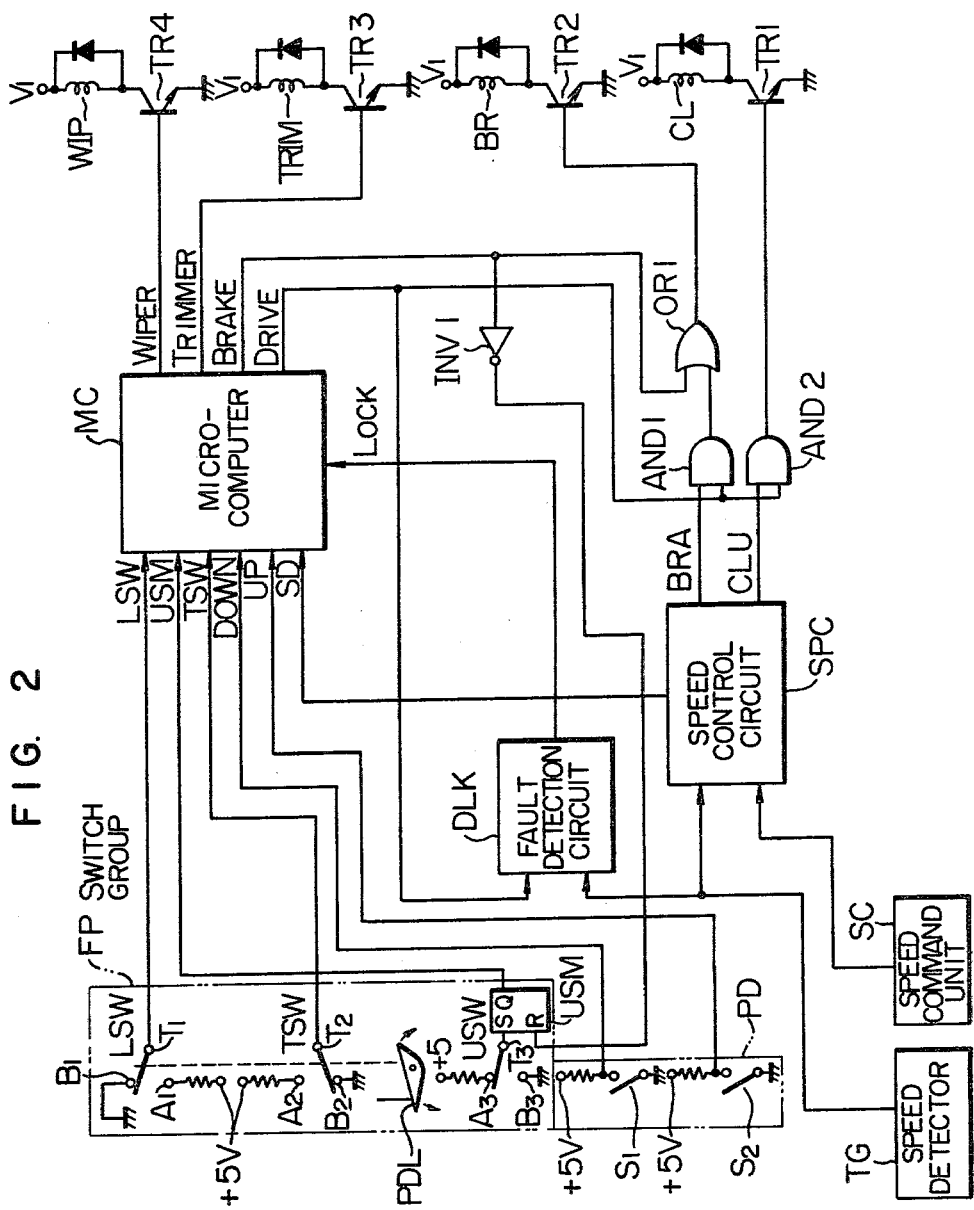
FIG. 2 shows a block diagram of a control circuit therefor.

FIG. 2 shows a specific circuit diagram of the control circuit 11, and it comprises a group of switches FP which are to be operated by the operator, the position detector PD mounted on the shaft of the sewing machine 8, a microcomputer MC for effecting a sequence control and constituting a main portion of the control circuit 11, a speed control circuit SPC which receives the output signals of the speed detector TG and the speed command unit SC to control the rotational speed of the motor, and a fault detection circuit DLK which shifts the sequence to a fault sequence through the microcomputer MC when any fault occurs in the sewing machine.

The group of switches FP comprise switches LSW and TSW having contacts which are switched by the pedal operated by the operator, a manually operated switch USW for stopping the needle of the sewing machine at an elevated position, and a memory USM for storing the result of switching of the switch USW.

The switch LSW functions to issue a high speed sewing command to the sewing machine 8 and has contacts $A_1$ and $B_1$. When the pedal PDL is stepped forward, a contact $T_1$ is connected to the contact $A_1$ to assume an ON state. The switch TSW functions to issue a thread cutting command at the end of sewing. When the pedal is stepped backward an enable contact $T_2$ is connected to a D.C. power supply (+5 V) through the contact $A_2$. The switch USW functions to issue a command to stop the needle of the sewing machine at the elevated position. It is normally grounded through a contact $B_2$, and when the operator manually throws a contact $T_3$ to a contact $A_3$, an input signal is applied to a terminal S of the memory USM.

The memory USM may comprise a flip-flop an output terminal Q of which, together with the terminals $T_1$ and $T_2$ of the switches LSW and TSW, is connected to input terminals of a microcomputer MC. A reset terminal R of the flip-flop receives a brake signal from the microcomputer MC through an inverter INV1.

The position detector PD detects a vertical position of the needle of the sewing machine 8 and it comprises a normally closed upper switch UP and a normally closed lower switch DOWN, each of which is opened when the needle enters a predetermined zone to produce a signal. When the switches UP and DOWN are illustrated by mechanical contacts $S_1$ and $S_2$, they may be electrical switch means (such as high frequency inductors, Hall effect elements or photo-transistors). Output terminals of the switches UP and DOWN are connected to input terminals of the microcomputers MC.

Figure 3:
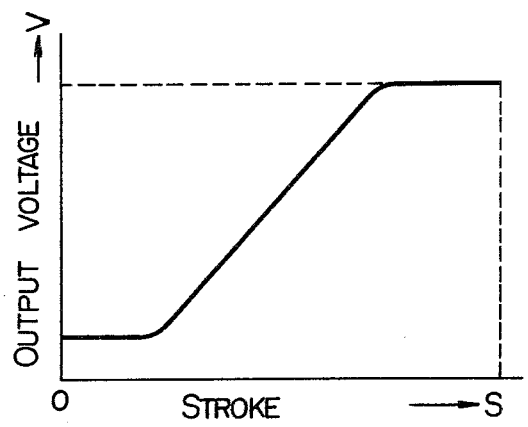
FIG. 3 shows a characteristic curve illustrating a relationship between a stroke and an output voltage of a speed command unit.
Figure 4:
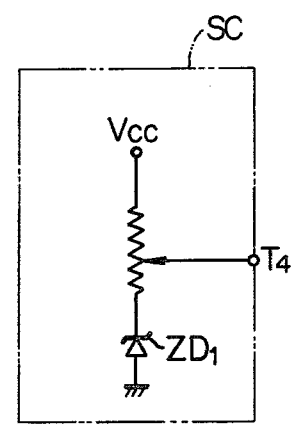
FIG. 4 shows a circuit diagram of a specific embodiment thereof.

A speed control circuit SPC has an input terminal connected to the shaft of the sewing machine 8, and it is connected to the speed detector TG for detecting the rotational speed and the speed command unit SC and produces signals CLU and BRA for controlling the energization of the clutch winding CL and the brake winding BR, respectively and a slow speed detection signal SD for driving the sewing machine at a predetermined slow speed. The speed command signal SC produces an output signal as shown in FIG. 3 in linked relation with the pedal PDL. As shown in FIG. 4, a movable arm $T_4$ of a potentiometer $VR_1$ having one end connected to a D.C. power supply $V_{CC}$ and the other end grounded through a zener diode $ZD_1$ is linked to the pedal PDL so that when the contact $A_1$ of the switch LSW of the switch group FP is closed, the movable arm $T_4$ is moved vertically in accordance with the amount of step-in of the pedal PDL.

It should be readily understood that the signal generation mechanism of the speed command unit SC is not limited to the potentiometer $VR_1$ but it may be a differential transformer, a rotary transformer or a Hall effect element so long as it produces the output signal as shown in FIG. 3.

Figure 5:
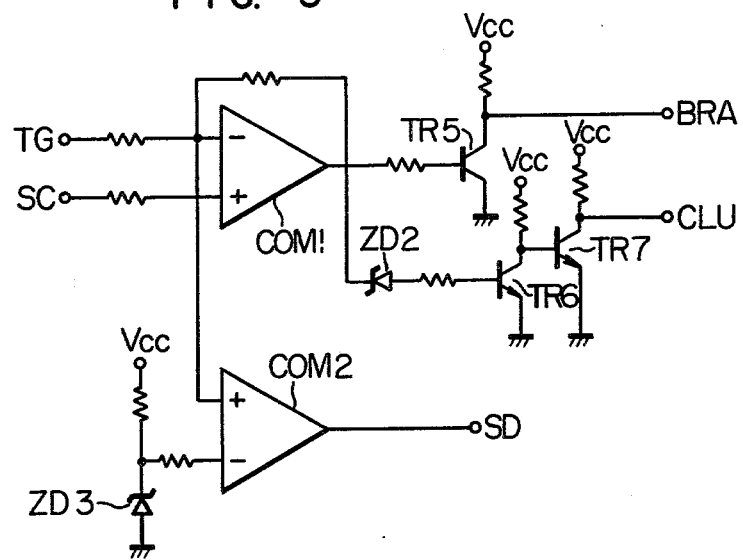
FIG. 5 shows a wiring diagram of a speed control circuit.

The speed control circuit SPC may be constructed as shown in FIG. 5, in which the output signals of the speed detector TG and the speed command unit SC are connected to a comparator COM1 through resistors so that the comparator COM1 renders a transistor $TR_5$ conductive to nullify the brake signal BRA when the output signal of the speed detector TG is smaller than the output signal (command signal) of the speed command unit SC. By designing the comparator COM1 such that the output of the comparator COM1 is higher than zener voltage $VZ_2$ of a zener diode $ZD_2$, a transistor $TR_6$ is turned on through the zener diode $ZD_2$ to turn off a transistor $TR_7$ so that the clutch signal CLU is turned on (HIGH level). A zener voltage of a zener diode $ZD_3$ and the output signal of the speed detector TG are applied to a comparator COM2 where they are compared, and if a constant low speed is detected, the comparator COM2 produces an output signal SD.

Figure 6:
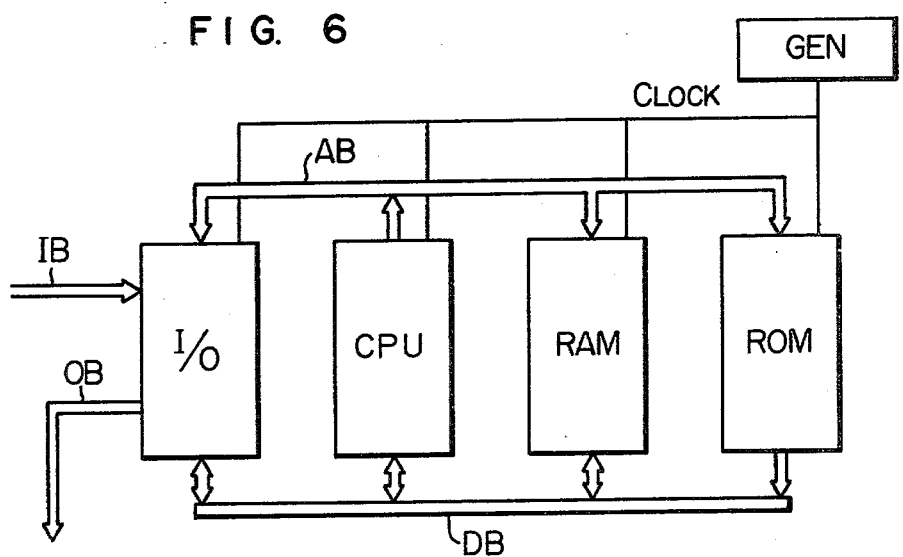
FIG. 6 is a block diagram showing a configuration of a microcomputer.

As shown in FIG. 6, the microcomputer MC comprises a central processing unit CPU which carries out arithmetic operations and controls to other blocks, a program memory ROM for storing a sequence program, a data memory RAM for temporarily storing data, an input/output interface I/O and a clock signal generator GEN for generating clock signals to drive those blocks. Each of the above blocks is interconnected through an address bus AB and a data bus DB. The microcomputer MC in the illustrated embodiment is of a 4-bit configuration.

The interface I/O has an input bus IB and an output bus OB, and the input bus IB receives various command signals for the sewing machine, such as outputs of the switches LSW and TSW of the switch group FP, an output of a memory USM which stores a command for stopping the needle at the elevated position, outputs of the switches UP and DOWN of the position detector PD, a low-speed detection signal SD of the speed control circuit SPC and an output signal LOCK of the fault detection circuit DLK. The output bus OB receives various control signals for controlling the sewing machine. The output signal from the output bus OB enables the output of the speed control circuit SPC to produce a drive signal DRIVE to energize the clutch winding CL, a brake signal BRAKE to energize the brake winding BR, a signal TRIMMER for energizing the trimming solenoid TRIM and a signal WIPER for energizing the wiper WIP.

The drive signal DRIVE is applied to the first input terminals of AND gates $AND_1$ and $AND_2$, respectively, and the brake signal BRA of the speed control circuit SPC is applied to the second input terminal of the AND gate $AND_1$. The clutch signal CLU of the speed control circuit SPC is applied to the second input terminal of the AND gate $AND_2$ while an output of the AND gate $AND_2$ is connected to a base of the transistor $TR_1$ to control the energization of the clutch winding CL.

$OR_1$ denotes an OR gate having two input terminals one of which receives the brake signal BRAKE of the microcomputer MC and the other is connected to the output terminal of the AND gate $AND_1$. An output terminal of the OR gate $OR_1$ is connected to a base of the transistor $TR_2$ to control the energization of the brake winding BR. The trimming signal TRIMMER of the microcomputer MC is applied to a base of the transistor $TR_3$ to control the energization of the trimming solenoid TRIM while the wiping signal WIPER is applied to a base of the transistor $TR_4$ to control the energization of the wiping solenoid WIP.

Figure 7:
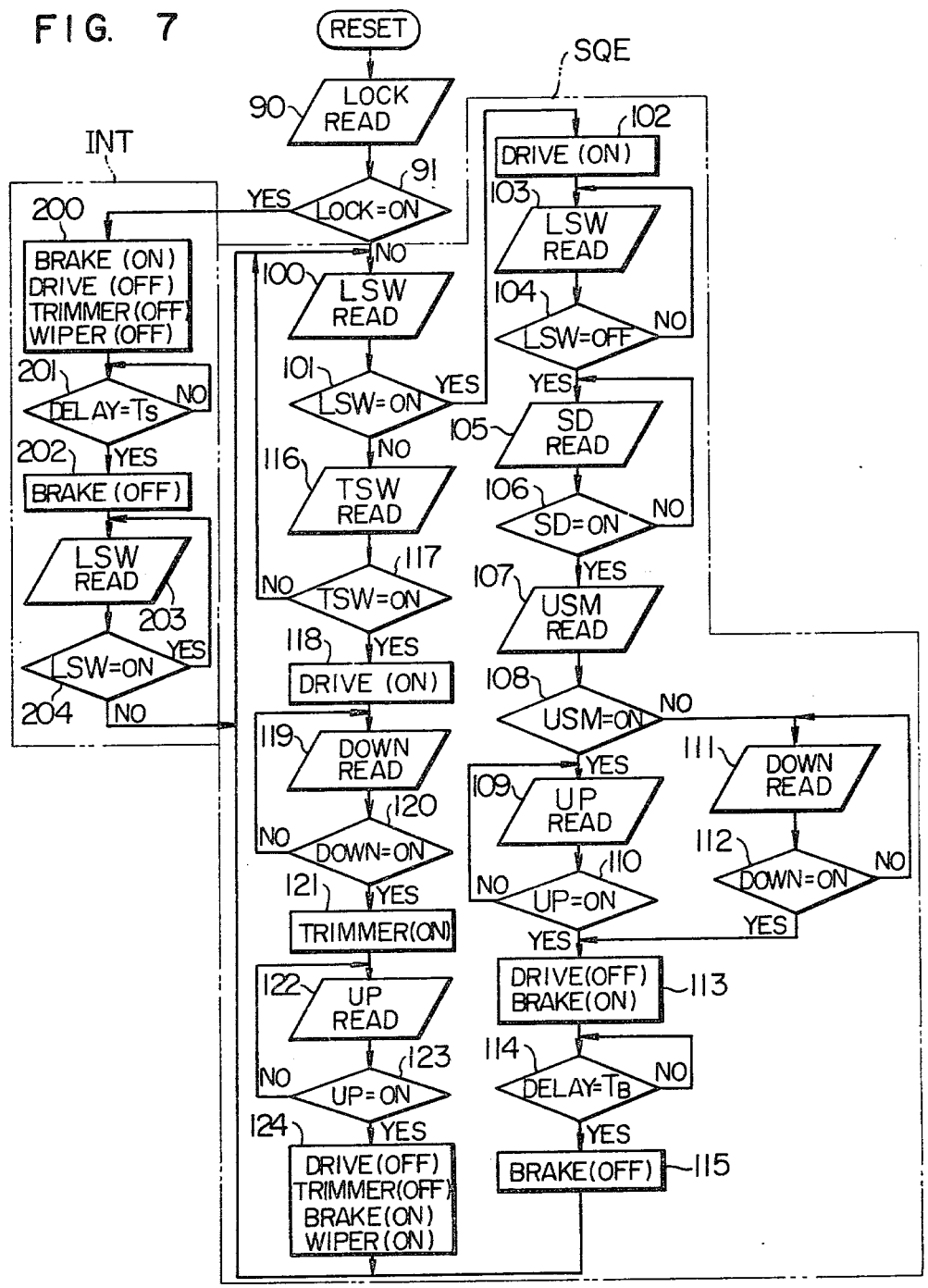
FIG. 7 shows a flow chart in a sequence control in the present invention.

The operation sequence of the present sewing machine is now explained with reference to a flow chart of FIG. 7. The sequence is carried out in accordance with a sequence of micro-instructions stored in the program memory (fixed memory) ROM of the microcomputer MC. The flow chart can be roughly divided into two parts, one being a normal sequence SQE and the other being an abnormal sequence INT such as in case of locking of the sewing machine. The operation in the sequence SQE is as follows:

In the sequence SQE, the switches LSW and TSW of the switch group FP are first checked. In the steps 100 and 101, if LSW=ON, the signal DRIVE is turned ON in the step 102 to enable the speed control circuit SPC to effect high speed sewing. Next, in the steps 103 and 104, the LSW is checked for OFF (GND) state. IF LSW=ON, the LSW is again checked. If LSW=OFF, the low speed detection signal SD is checked in the steps 105 and 106. If SD≠ON, the signal SD is again checked. IF SD=ON, the content of the memory USM (the USW) is checked in the steps 107 and 108. If USM=ON, the sequence of stopping the needle at the elevated position starts, and if USM≠ON, the sequence of stopping the needle at the down position starts. In the sequence of stopping the needle at the elevated position, the elevated position zone signal UP is checked in the steps 109 and 110, and if UP=ON, the signal DRIVE is turned OFF in the step 113 to disable the output of the speed control circuit SPC and turn ON the brake signal BRAKE and energizes the brake winding BR for a period $T_B$ in the steps 114 and 115 to stop the needle at the elevated position and then the sequence returns to the initial check of the signals of the FP. If UP≠ON, the UP is checked again. Similarly, if USM≠ON, the down-position zone signal DOWN is checked in the steps 111 and 112.

In the check at the stopped condition, if LSW≠ON, the next TSW is checked in the steps 116 and 117. If TSW≠ON, the sequence returns to the step 100 to check the LSW at the stopped condition. If TSW=ON, the signal DRIVE is turned ON at the step 118 and the down-position zone signal DOWN is checked at the steps 119 and 120. If DOWN=ON, the trimming solenoid signal TRIMMER is turned ON in the step 121 to energize the trimming solenoid TRIM and check the elevated position zone signal UP in the steps 122 and 123. If UP≠ON, the UP is again checked. If UP=ON, the signals DRIVE and TRIMMER are turned OFF at the step 124 and the signals BRAKE and WIPER are turned ON for a predetermined time period to energize the brake winding BR and the wiping solenoid WIP and check the signal LSW at the stopped condition. The above is the normal sequence.

Figure 8:
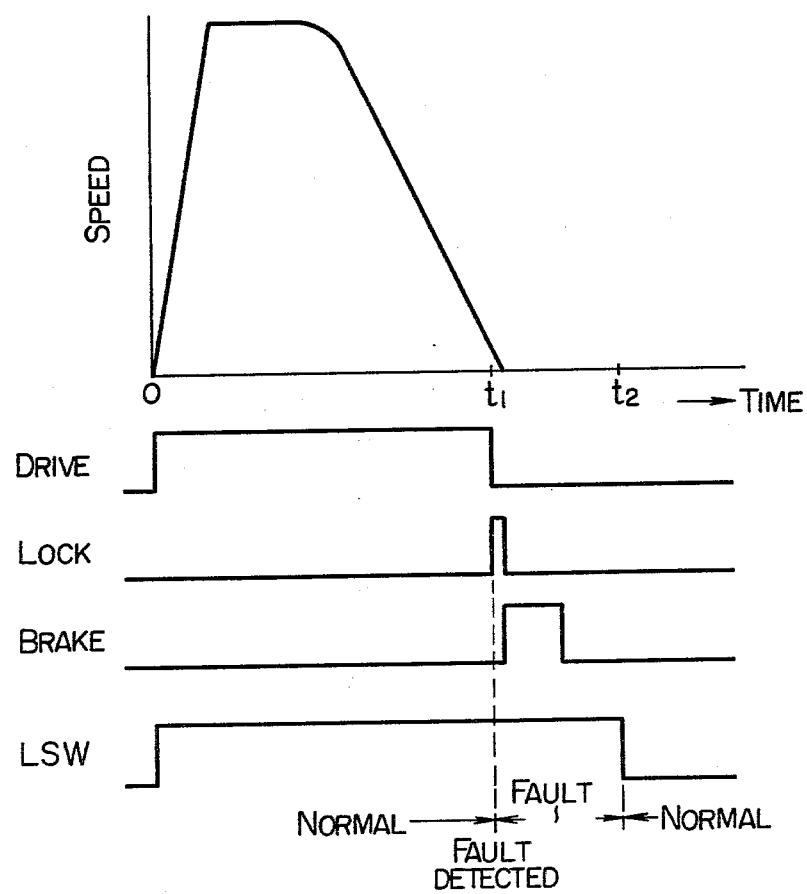
FIG. 8 shows a timing chart for illustrating an escape from an abnormal sequence.

When the sewing machine locks during the operation, a signal LOCK from the fault detection circuit DLK is turned ON to initiate an interruption sequence. Thus, the program counter jumps to the program for checking the signal LOCK to initiate the sequence INT. This is done in the steps 90 and 91. In the step 200, the sequence INT turns OFF the output signals other than the signal BRAKE to energize the brake winding BR for a predetermined time period $T_S$ in the step 201 and then moves to the step 202. In order for the sequence to move out of the sequence INT into the normal sequence, the return of the pedal PDL to a neutral position is checked in the steps 203 and 204 at the end of braking when the lock occurs. This operation is illustrated in FIG. 8.

When the operator steps the pedal PDL forward to turn on the switch LSW, the signal DRIVE is turned on so that the sewing machine is driven at high speed. When the sewing machine is locked at the time $t_1$, the fault detection circuit DLK detects the fault and produces the signal LOCK. Thus, the program is interrupted and it enters the interrupt sequence INT so that all of the output signals WIPER, TRIMMER and DRIVE other than the signal BRAKE are turned off, the signal BRAKE being turned on for a predetermined time period to brake the motor for the predetermined time period. So long as the pedal PDL is being stepped forward, the sequence cannot escape from the interrupt sequence INT.

When the pedal PDL is returned to the neutral position at the time $t_2$, the sequence escapes from the interrupt sequence INT and checks the signals of the switch group FP at the stopped condition. As described above, when the fault is detected, the normal sequence is interrupted, and when the input signal condition (e.g. LSW=ON) issued by the operator during the fault condition changes to a different input signal condition (e.g., LSW=OFF), the sequence escapes from the interrupt sequence INT and returns to the stop sequence, where it checks the signals.

Figure 9:
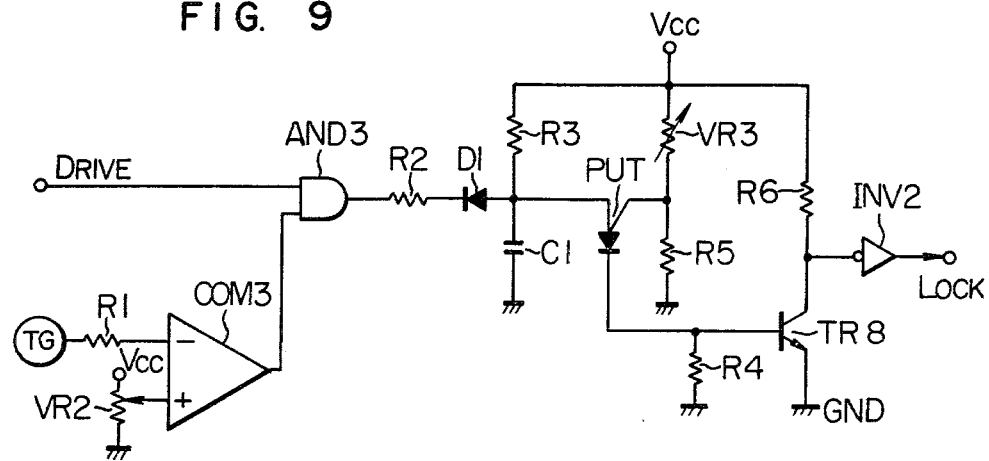
FIG. 9 shows a wiring diagram illustrating a specific embodiment of an abnormal state detection circuit.

An example of the fault detection circuit is shown in FIG. 9. COM 3 denotes a comparator having a positive (+) input terminal connected to a movable arm of a potentiometer $VR_2$ one end of which is grounded and the other end of which is connected to a positive terminal of a power supply $V_{CC}$. A negative (−) terminal of the comparator COM 3 is connected to the speed detector TG through a resistor $R_1$. An output of the comparator COM 3 is applied to one input terminal of an AND gate $AND_3$ the other input terminal of which receives the signal DRIVE which enables the speed control circuit SC. An output of the AND gate $AND_3$ is coupled through a resistor $R_2$ and a diode $D_1$ to a capacitor $C_1$, a resistor $R_3$ and an anode of a PUT (which is a trade name of a programmable unijunction transistor sold by General Electric Corp.). A cathode of the PUT is connected to a resistor $R_4$ and a base of a transistor $TR_8$ and a gate of the PUT is connected to a resistor $R_5$ and a potentiometer $VR_3$. The other end of the resistor $R_3$, one end of a resistor $R_6$, the other ends of the potentiometers $VR_2$ and $VR_3$ are connected to the positive terminal of the power supply $V_{CC}$ and the other ends of the resistors $R_4$ and $R_5$ and the capacitor $C_1$ and an emitter of the transistor $TR_8$ are grounded. A collector of the transistor $TR_8$ is connected to the other end of the resistor $R_6$ and an input terminal of an inverter $INV_2$, an output terminal of which produces the output signal LOCK.

The circuit shown in FIG. 9 operates in the following manner. When the output of the speed detector TG is zero, a divided voltage of the potentiometer $VR_2$ is applied to the comparator $COM_3$ so that it produces a high (H) level output. When the speed detector TG produces an A.C. output, the comparator $COM_3$ produces pulses of high (H) level and low (L) level the frequency of which is proportional to the rotational speed of the sewing machine. These pulses appear at the output terminal of the AND gate $AND_3$ only when the signal DRIVE which is applied to the other input terminal of the AND gate $AND_3$ to enable the speed control is H level. The capacitor $C_1$ discharges when the output of the AND gate $AND_3$ is L level, and it is charged through the resistor $R_3$ when the output of the AND gate $AND_3$ is H level.

Assume that the rotational speed of the sewing machine is decreased so that the output of the AND gate $AND_3$ is H level for an extended time period, the voltage across the capacitor $C_1$ rises. The anode-cathode of the PUT conducts when the anode-cathode voltage thereof is higher than the gate-cathode voltage, and the PUT is reset to the cutoff condition when the anode-cathode current falls below a sustain current. Thus, if the voltage across the capacitor $C_1$ rises above the gate voltage which is controlled by the potentiometer $VR_3$, the PUT conducts to turn on the transistor $TR_8$. As the capacitor $C_1$ discharges, the PUT is rendered non-conductive. Accordingly, a pulsive voltage appears at the collector of the transistor $TR_8$. This pulsive voltage is inverted by the inverter $INV_2$ to produce the positive signal LOCK, which is applied to the input terminal LOCK of the microcomputer MC so that the operation as illustrated in FIG. 7 takes place when the fault is detected.

According to the preferred embodiment of the present invention, the motor is prevented from being burnt even if the sewing machine is locked during the operation because of the fault thereof. Furthermore, even if the sewing machine is locked during the trimming operation, the motor as well as the trimming solenoid are prevented from being burnt because the energization of the motor as well as the energization of the trimming solenoid are blocked. When the sewing machine is locked, a big force would be applied to the clutch plate and the latter would be materially weared if the locking state continues for a long time, resulting in the decrease of durability of the clutch plate. The present invention can avoid such a problem. Further, when the sewing machine is tilted in order to adjust the sewing machine, the belt 10 is loosen. If the pedal PDL is stepped under this condition, the pulley 7 would continue to rotate at a high speed because the output of the speed detector PD is zero, and a dangerous condition would occur when the sewing machine is moved back to an upright position because the sewing machine would rotate at a high speed. According to the present invention, when a predetermined time passes after the pedal PDL has been stepped, the output of the speed detector TG is no longer produced and hence the sewing machine is no longer driven. Therefore, it is determined as if the sewing machine were locked and the fault detection circuit DLK operates to stop the pulley 7. Thus, the above dangerous condition is prevented. While the microcomputer MC is interrupted in the above embodiment, it may be reset instead. From the standpoint of safety for the operator, the period in which the interrupt sequence INT is active may be during the trimming period. While the interrupt sequence occurs only when the sewing machine is locked in the above embodiment, an allowable sewing machine speed to the specified speed may be preset and the fault condition may be determined when the actual speed falls below the preset speed. Since the speed of the sewing machine is near zero when the locking occurs, it is, of course, lower than the allowable speed. A higher speed condition than the specified speed may be similarly determined by changing the determination logic.

While the digital control by the microcomputer has been shown in the above embodiment, analog control may be used to control the speed of the sewing machine to a command speed and automatically stop the sewing machine when the fault condition continues for a predetermined time period. An embodiment therefor is explained with reference to FIG. 10.

Figure 10:
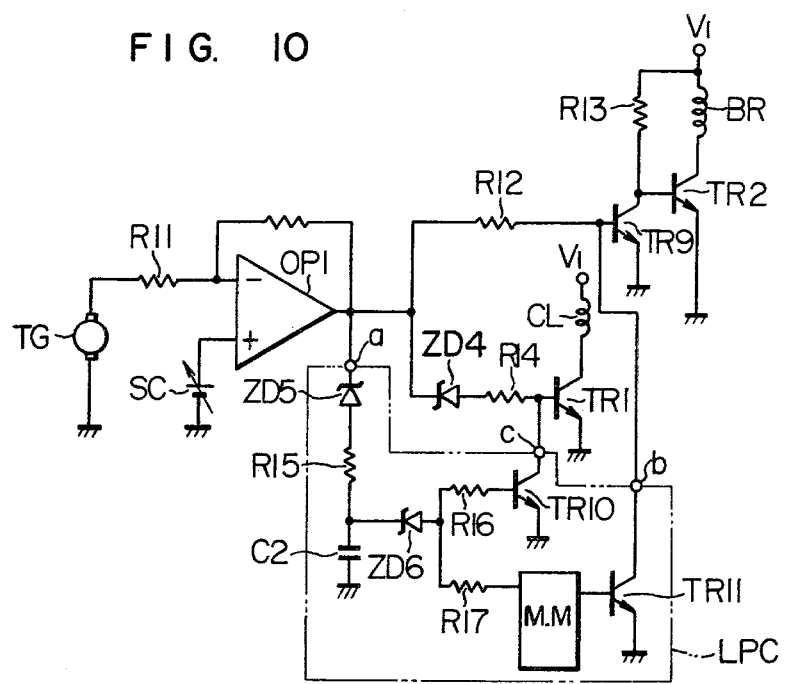
FIG. 10 shows a wiring diagram of another embodiment of the abnormal detection circuit.

In FIG. 10, one end of the speed detector TG is grounded while the other end thereof is connected to a negative (-) input terminal of an operational amplifier $OP_1$ through a resistor $R_{11}$. A positive (+) input terminal of the operational amplifier $OP_1$ is coupled to the speed command unit SC. An output of the operational amplifier $OP_1$ is coupled to a base of a transistor $TR_9$ through a resistor $R_{12}$, and also to a cathode of a zener diode $ZD_4$.

An emitter of the transistor $TR_9$ is grounded while a collector thereof is connected to a base of a transistor $TR_2$ connected in series with the brake winding BR, and also to the power supply $V_{CC}$ through a resistor $R_{13}$. An anode of the zener diode $ZD_4$ is connected through a resistor $R_{14}$ to a base of a transistor $TR_1$ connected in series with the clutch winding CL. $ZD_5$ denotes a first constant voltage device (zener diode) of a lock protection circuit LPC, with a cathode thereof being connected to an output terminal of the operational amplifier $OP_1$ through a terminal a and an anode thereof being connected through a resistor $R_{15}$ to a capacitor $C_2$ and a cathode of a second constant voltage device (zener diode) $ZD_6$, an anode of which is connected to a base of a transistor $TR_{10}$ through a resistor $R_{16}$ and also to a base of a transistor $TR_{11}$ through a resistor $R_{17}$ and a monostable multivibrator MM. A collector of the transistor $TR_{10}$ is connected to the base of the transistor $TR_1$ through a terminal c, and a collector of the transistor $TR_{11}$ is connected to the base of the transistor $TR_9$ through a terminal b.

In the construction described above, when the output of the speed detector TG is lower than the command voltage of the speed command unit SC, the output of the operational amplifier $OP_1$ is high, and if the output exceeds the voltage across the zener diode $ZD_4$, the transistor $TR_1$ conducts to energize the clutch winding Cl to increase the speed of the sewing machine. In this case, since the transistor $TR_9$ is conductive, the transistor $TR_2$ is rendered non-conductive and hence the brake winding BR is not energized. By selecting the voltage $VZ_5$ across the zener diode $ZD_5$ to be higher than the voltage $VZ_4$ across the zener diode $ZD_4$, the capacitor $C_2$ is not substantially charged during the normal operation so that the transistor $TR_{10}$ and the monostable multivibrator MM are not operated.

When the speed of the sewing machine is higher than the command voltage of the speed command unit SC, the output of the operational amplifier $OP_1$ decreases and the transistor $TR_1$ is cut off by the zener diode $ZD_4$ while the transistor $TR_9$ is also cut off because the base potential thereof falls. Therefore, the transistor $TR_2$ is turned on to energize the brake winding BR. In this case, again, the protection circuit LPC including the transistor TR 10 and the monostable multivibrator MM is not operated.

When the sewing machine 8 is overloaded, the output of the speed detector TG is lower than the command voltage of the speed command unit SC and hence the output of the operational amplifier $OP_1$ increases to exceed the voltages $V_{Z4}$ and $V_{Z5}$ of the zener diodes $ZD_4$ and $ZD_5$. Accordingly, the clutch winding CL continues to be energized through the transistor $TR_1$.

On the other hand, the voltage across the capacitor $C_2$ rises at a time constant determined by the resistor $R_{15}$ and the capacitor $C_2$. If this condition continues over a predetermined period of time, the voltage across the capacitor $C_2$ exceeds the voltage $V_{Z6}$ of the zener diode $ZD_6$ and the transistor $TR_{10}$ is turned on to lower the base voltage of the transistor $TR_1$ to cut off the same. As a result, the energization of the clutch winding CL is inhibited.

At the same time, the monostable multivibrator MM is operated for a predetermined period of time to turn on the transistor $TR_{11}$ and turn off the transistor $TR_9$. As a result, the transistor $TR_2$ is turned on during that period to rapidly stop the sewing machine 8.

Accordingly, the motor 2 is released from the load so that the burning or damage thereof is prevented and the energization of the clutch winding L does not last for a long time. Further, at the time of start or when the command signal changes abruptly so that the output of the operational amplifier $OP_1$ temporarily exceeds the voltage $V_{Z5}$ of the zener diode $ZD_5$, the voltage across the capacitor $C_2$ does not exceed the voltage $V_{Z6}$ of the zener diode $ZD_6$ because of a short period. Therefore, the protection circuit LPC does not operate.

While the electric sewing machine having the electromagnetic clutch has been shown in FIGS. 1 to 10, the present invention may also be applicable to a direct drive system in which the sewing machine 8 is directly coupled to the motor and the speed of the motor is controlled.

Figure 11:
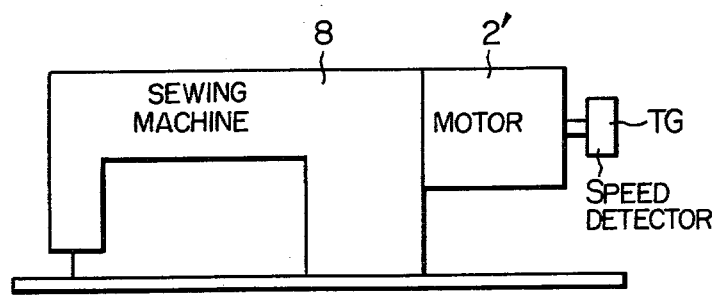
FIG. 11 shows a configuration of a direct drive system.
Figure 12:
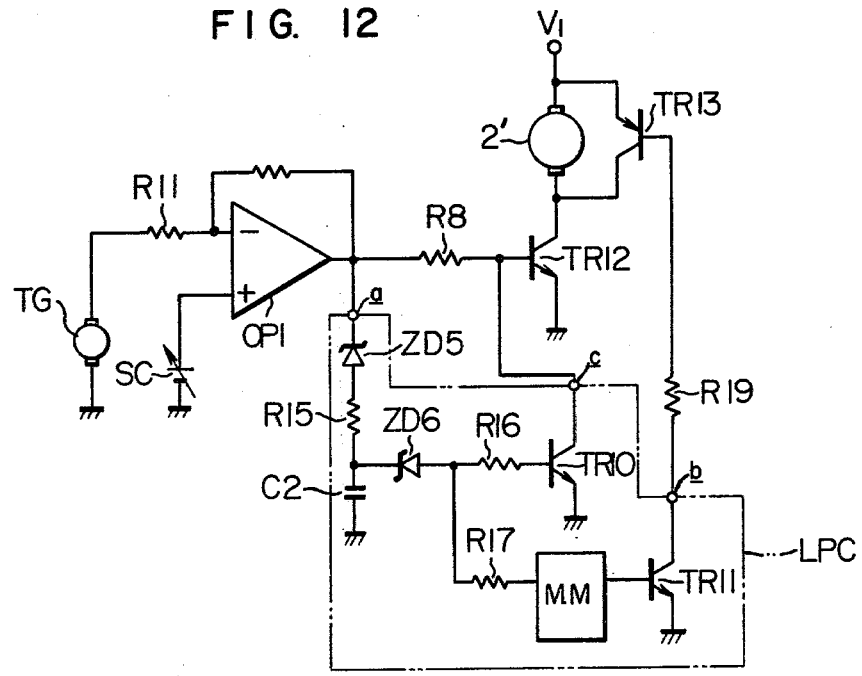
FIG. 12 shows a control circuit for use in the configuration of FIG. 11.

FIG. 11 shows a configuration therefor in which a D.C. motor 2' and the speed detector TG are directly coupled to the rotational shaft of the sewing machine 8. FIG. 12 shows a control circuit therefor.

In FIG. 12, an output terminal of an operational amplifier $OP_1$ is connected to a base of a transistor $TR_{12}$ through a resistor $R_{18}$ and also to a terminal a of the protection circuit LPC. A base of the transistor $TR_{12}$ is connected to a terminal c of the protection circuit LPC, and a collector of the transistor $TR_{12}$ is connected to a power supply $V_1$ through the D.C. motor 2'. A terminal b of the protection circuit LPC is connected to a base of a transistor $TR_{13}$ through a resistor $R_{19}$. The transistor $TR_{13}$ is connected in parallel with the motor 2' to apply a dynamic brake to the motor 2'.

With this construction, when the output of the speed detector TG is lower than the command value of the speed command unit SC, the output of the operational amplifier $OP_1$ is higher so that the transistor $TR_{12}$ is turned on to flow more current through the motor 2' to increase the speed of the sewing machine 8 for approximating the speed to the command speed.

On the other hand, when the speed of the sewing machine is higher than the command speed, the output of the speed detector is higher so that the output of the operational amplifier $OP_1$ decreases to bias the transistor $TR_{12}$ toward the cutoff. Thus, the voltage applied to the motor 2' is lowered to approximate the speed of the sewing machine to the command speed.

If the sewing machine is overloaded and the lower output condition of the speed detector TG than the command value lasts for a long time, the output of the operational amplifier $OP_1$ exceeds the voltage $V_{Z5}$ of the zener diode $ZD_5$ so that the capacitor $C_2$ is charged at a time constant determined by the capacitor $C_2$ and the resistor $R_{15}$. If this condition continues until the voltage across the capacitor $C_2$ exceeds the voltage $V_{Z6}$ of the zener diode $ZD_6$, the transistor $TR_{10}$ is turned on, which turns off the transistor $TR_{12}$ to deenergize the motor 2. At the same time, the monostable multivibrator MM is actuated to render the transistors $TR_{11}$ and $TR_{13}$ conductive for a short period of time to apply dynamic braking to the motor 2' for to rapidly stop the same.

According to the embodiment described above, the overloading of the sewing machine is prevented and the motor is effectively prevented from the locking of the sewing machine. Furthermore, when the motor itself is out of order, the energization of the motor is stopped if the fault condition continues for a predetermined period of time to prevent the burning of the motor.

While two constant voltage devices (zener diodes) are used in the protection circuit LPC described above, it will be readily understood that the voltage level applied to the protection circuit LPC, that is, the speed of the sewing machine to the preset rotational speed can be adjusted by varying the voltage $V_{Z5}$ of the first zener diode $ZD_5$, and the time required for the protection circuit LPC to operate can be adjusted by changing the voltage $V_{Z6}$ of the second zener diode $ZD_6$.

What is claimed is:

1. A protection apparatus for an electric sewing machine comprising:

drive means for driving said sewing machine by a motor;

a speed detector for detecting an actual rotational speed of a shaft of said sewing machine;

a speed command unit for issuing a speed command to drive said shaft of said sewing machine at a predetermined rotational speed;

comparator means for comparing an output of said speed detector with said speed command of said speed command unit to determine from the comparison result whether the load condition of said sewing machine is normal or abnormal; and control means operative when an abnormal load condition of said sewing machine is detected by said comparator means to shift the operation sequence of said sewing machine from a normal operation sequence to a predetermined operation sequence for an abnormal load and to control the operation of said sewing machine in accordance with said predetermined operation sequence.

2. A protection apparatus for an electric sewing machine according to claim 1 wherein said comparator means comprises an amplifier means for amplifying a signal indicative of the determination as to whether the load condition of the sewing machine is normal or abnormal and means for disabling said drive means to said sewing machine when said amplifier means maintains an output higher than a predetermined level for a predetermined period of time thereby indicating an abnormal load condition.

3. A protection apparatus for an electric sewing machine according to claim 2 wherein said means for disabling said drive means includes means for enabling a brake mechanism for stepping said sewing machine, for a predetermined period of time.

4. A protection apparatus according to claims 1, 2 or 3, wherein said abnormal load condition is an overload condition.

5. A protection apparatus for an electric sewing machine comprising:

drive means for driving said sewing machine by a motor;

brake means for braking said sewing machine;

speed detector means for detecting a rotational speed of a shaft of said sewing machine;

control circuit means for controlling said drive means and said brake means to drive said sewing machine at a predetermined rotational speed;

said control circuit means including at least a microcomputer and a comparator means for comparing the rotational speed of said sewing machine detected by said speed detector means with a command set by an operator to determine whether the rotational speed of said sewing machine is lower than the predetermined speed; and control means operative when the lower rotational speed of said sewing machine is detected by said comparator means to interrupt said microcomputer and control the operation sequence of said sewing machine by said microcomputer in accordance with a predetermined operation sequence for an abnormal condition.

6. A protection apparatus for an electric sewing machine according to claim 5 further comprising means operative in the course of said predetermined operation sequence to stop said sewing machine and cause the operation of the sewing machine to escape from said predetermined sequence when the speed command is eliminated.

7. A protection apparatus for an electric sewing machine according to claim 6 wherein said control means interrupts said microcomputer while said sewing machine is trimming.

* * * * *